US009642018B2

(12) United States Patent
Clevorn et al.

(10) Patent No.: US 9,642,018 B2
(45) Date of Patent: May 2, 2017

(54) COMMUNICATION ARRANGEMENT WITH OVERLAP AREA

(75) Inventors: Thorsten Clevorn, Duesseldorf (DE); Christian Drewes, Germering (DE); Juergen Kreuchauf, San Francisco, CA (US)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 174 days.

(21) Appl. No.: 13/207,491

(22) Filed: Aug. 11, 2011

(65) Prior Publication Data

US 2012/0040660 A1   Feb. 16, 2012

Related U.S. Application Data

(60) Provisional application No. 61/372,486, filed on Aug. 11, 2010.

(30) Foreign Application Priority Data

Aug. 11, 2010 (DE) ........................ 10 2010 036 948

(51) Int. Cl.
| | |
|---|---|
| H04W 36/00 | (2009.01) |
| H04W 16/26 | (2009.01) |
| H01Q 1/24 | (2006.01) |
| H01Q 19/10 | (2006.01) |
| H04W 36/30 | (2009.01) |
| H04B 7/26 | (2006.01) |

(52) U.S. Cl.
CPC ............ *H04W 16/26* (2013.01); *H01Q 1/246* (2013.01); *H01Q 19/10* (2013.01); *H04B 7/2606* (2013.01); *H04W 36/30* (2013.01)

(58) Field of Classification Search
CPC ............ H04W 36/00; H04W 36/0005; H04W 36/0011; H04W 36/0061
USPC .......................................... 455/443; 370/338
See application file for complete search history.

(56) References Cited

U.S. PATENT DOCUMENTS

| 6,259,918 B1 | 7/2001 | Labonte et al. |
| 7,679,576 B2 | 3/2010 | Riedel et al. |
| 7,929,905 B1* | 4/2011 | Warner et al. ................... 455/7 |
| 2002/0045461 A1* | 4/2002 | Bongfeldt ..................... 455/522 |

(Continued)

FOREIGN PATENT DOCUMENTS

| DE | 69932458 T2 | 2/2007 |
| DE | 102006037517 A1 | 2/2008 |
| JP | 63009208 A | 1/1988 |

OTHER PUBLICATIONS

English Language Abstract of JP 63009208 A, Jan. 14, 1988.
Office Action received for the corresponding German patent application No. 102010036948.9, mailed Jul. 28, 2015, 7 pages.

*Primary Examiner* — Marcos Batista
(74) *Attorney, Agent, or Firm* — Viering, Jentschura & Partner mbB

(57) ABSTRACT

According to one embodiment, a communication arrangement is provided which has a first antenna for transmitting signals into the coverage area of a first mobile radio cell, a second antenna for transmitting signals into the coverage area of a second mobile radio cell and a signal radiating device which is arranged for radiating signals, which are sent out by the first antenna, into an area which is associated with the coverage area of the first mobile radio cell and which overlaps the coverage area of the second mobile radio cell.

18 Claims, 15 Drawing Sheets

(56) References Cited

U.S. PATENT DOCUMENTS

| | | |
|---|---|---|
| 2002/0072393 A1 | 6/2002 | McGowan et al. |
| 2002/0086682 A1 | 7/2002 | Naghian |
| 2005/0026655 A1 | 2/2005 | Giaimo, III et al. |
| 2008/0036674 A1 | 2/2008 | Riedel et al. |
| 2008/0188226 A1* | 8/2008 | Tsai et al. .................. 455/443 |
| 2008/0227387 A1* | 9/2008 | Andersson ................... 455/15 |
| 2008/0272856 A1* | 11/2008 | Svensson et al. ............ 333/137 |
| 2009/0013365 A1* | 1/2009 | Huschke et al. .............. 725/118 |
| 2010/0033390 A1 | 2/2010 | Alamouti et al. |
| 2010/0075683 A1 | 3/2010 | Johansson et al. |
| 2010/0197223 A1 | 8/2010 | Saito et al. |

* cited by examiner

COMMUNICATION ARRANGEMENT WITH OVERLAP AREA

CROSS-REFERENCE TO RELATED APPLICATION

This application claims priority to German Patent Application Serial No. 10 2010 036 948.9, which was filed Aug. 11, 2010, and is incorporated herein by reference in its entirety. Furthermore, this application claims priority to U.S. Provisional Patent Application Ser. No. 61/372,486, which was filed Aug. 11, 2010, and is incorporated herein by reference in its entirety.

TECHNICAL FIELD

Various embodiments generally relate to a communication arrangement.

BACKGROUND

At the transition from the coverage area of one mobile radio cell to another mobile radio cell in a cellular mobile radio communication system, there may be locations which are not covered by either of the two mobile radio cells or at which the two mobile radio cells overlap only in a small area. The result can be that where a subscriber terminal of a cellular mobile radio communication system changes from one mobile radio cell to another mobile radio cell at such a location, a communication link to the network side of the mobile radio communication system breaks down since the subscriber terminal is located temporarily at a location which is not covered by a base station of the cellular mobile radio communication system, that is to say is located outside the coverage area of both mobile radio cells, or because the area of overlap of the two mobile radio cells is so small that the subscriber terminal passes through this area so quickly that the time for a successful handover procedure from one mobile radio cell to the other mobile radio cell is not sufficient. Such areas of transition between two mobile radio cells occur, for example, on motorways (or highways) at which base stations are placed very closely. It is desirable to provide systems in which it is avoided that link breakdowns occur for the above reasons.

SUMMARY

According to various embodiments, a communication arrangement is provided which has a first antenna for transmitting signals into the coverage area of a first mobile radio cell, a second antenna for transmitting signals into the coverage area of a second mobile radio cell and a signal radiating device which is arranged for radiating signals, which are sent out by the first antenna, into an area which is associated with the coverage area of the first mobile radio cell and which overlaps the coverage area of the second mobile radio cell.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description relates to the attached figures which show details and embodiments. These embodiments are described in such detail that the expert can carry out the invention. Other embodiments are also possible and the embodiments can be altered in structural, logical and electrical respect without deviating from the subject matter of the invention. The various embodiments do not necessarily exclude one another but various embodiments can be combined with one another so that new embodiments are produced.

In the text which follows, a cellular mobile radio communication system is described using a communication system according to LTE (Long Term Evolution) as an example. It should be noted that the communication system, according to other embodiments, can also be arranged in accordance with other communication standards, for example according to GSM (Global System for Mobile Communications), UMTS (Universal Mobile Telecommunications System), CDMA2000 (CDMA: Code Division Multiple Access), FOMA (Freedom of Mobile Access), etc.

Figure 1:
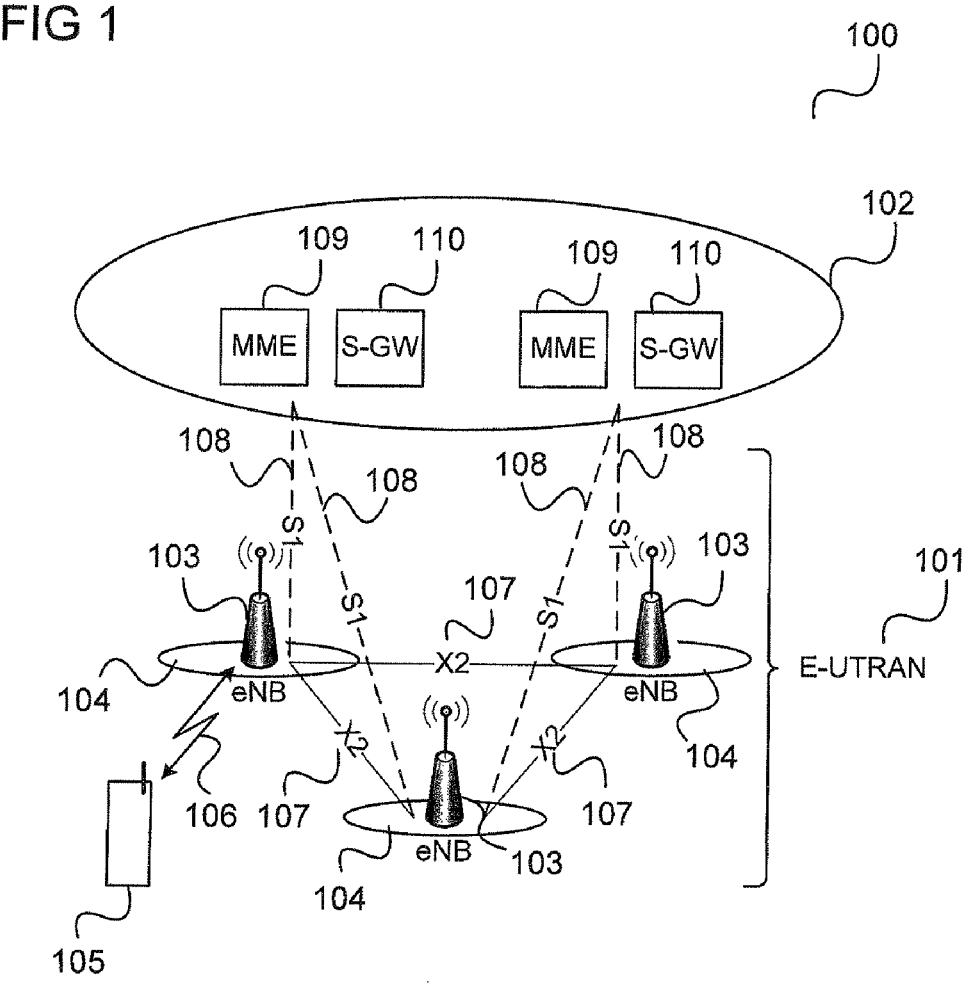
FIG. 1 shows a communication system according to one embodiment.

FIG. 1 shows a communication system 100 according to one embodiment.

According to this embodiment, the communication system 100 is arranged in accordance with the network architecture of LTE.

The communication system 100 has a radio access network (E-UTRAN, evolved UMTS terrestrial radio access network) 101 and a core network (EPC, evolved packet core) 102. The E-UTRAN 101 has base stations (called eNodeB, eNB according to LTE) 103. Each base station 103 supplies one or more mobile radio cells 104 of the E-UTRAN 101.

A mobile radio terminal (subscriber terminal, called user equipment, UE, according to LTE) 105 which is located in a mobile radio cell 104 can communicate with the core network 102 and with other mobile radio terminals 105 by means of the base station which operates the mobile radio cell 104.

Control data and payload data are conveyed between a base station 103 and a mobile radio terminal 105 which is located in a mobile radio cell 104 which is operated by the base station 103, via the air interface 106 on the basis of a multiple access method.

The base stations 103 are connected to one another by means of the X2 interface 107. The base stations 103 are also connected to the core network (called Evolved Packet Core according to LTE) 102, more precisely to an MME (Mobility Management Entity) 109 and to a serving gateway (S-GW) 110 by means of the S1 interface 108. The MME 109 is responsible for controlling the mobility of mobile radio terminals which are located in the coverage area of the E-UTRAN 101 whereas the serving gateway 110 is responsible for handling the transmission of payload data between mobile radio terminals 105 and the core network 102.

In the text which follows, an example of the arrangement of mobile radio cells 104 which are operated by a base station 103 is described.

Figure 2:
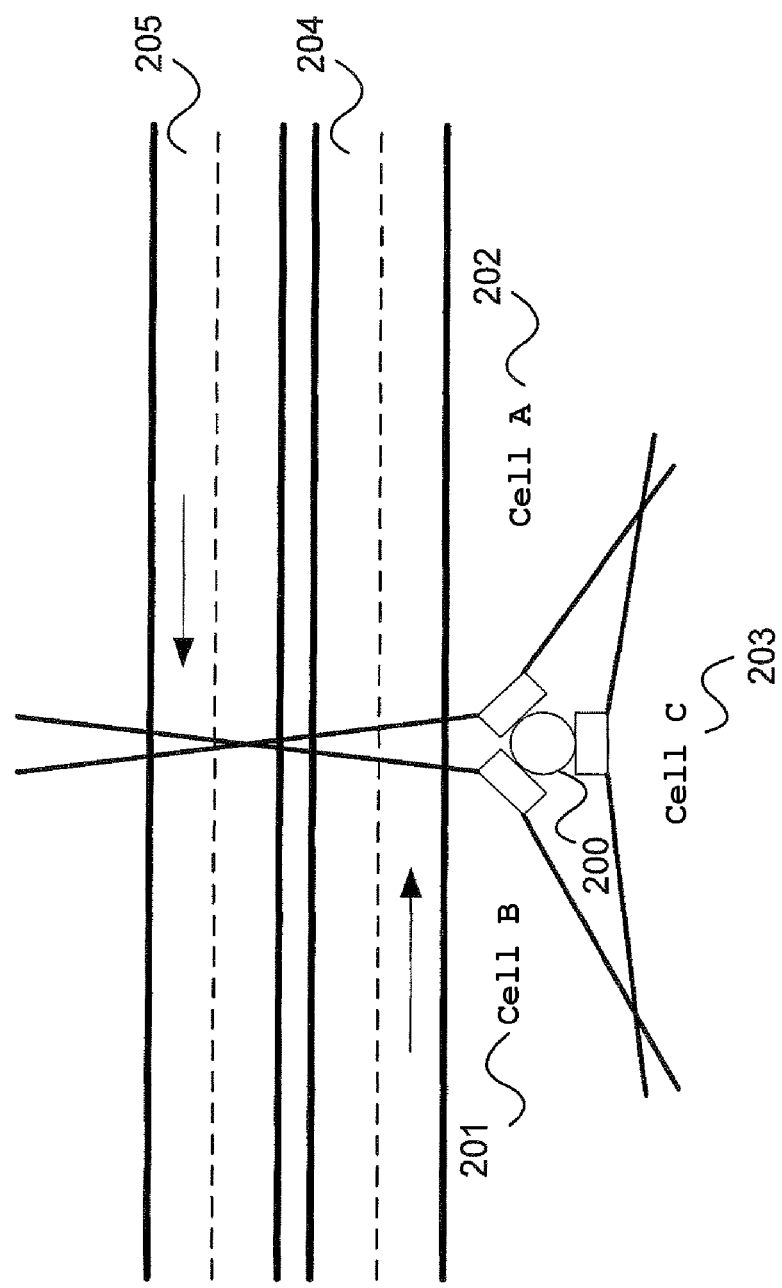
FIG. 2 shows a base station according to one embodiment.

FIG. 2 shows a base station 200 according to one embodiment.

In this embodiment, the base station 200 operates a first mobile radio cell 201, a second mobile radio cell 202 and a third mobile radio cell 203. The mobile radio cells 201, 202, 203 can also be considered as being three different mobile radio cell sectors which are operated by the base station 200. According to one embodiment, the mobile radio cells 201, 202, 203 are different mobile radio cells in the sense that they are assigned different scrambling codes.

In this example, the base station 200 has been placed in the vicinity of a motorway (or of a highway), having a first lane 204 which runs from left to right in FIG. 2, and a second lane 205 which runs from right to left in FIG. 2.

In cellular mobile radio communication systems, it is frequently the case that base stations are placed in the vicinity of a motorway or of a highway so that a large area of the motorway or of the highway can be covered (that is to say supplied) by the base stations.

If a mobile radio terminal 105 is moving through a region in a cellular mobile radio communication system such as the communication system 100 so that it is leaving the coverage area of a mobile radio cell 104 and entering into the coverage area of another mobile radio cell 105, a handover is required between the mobile radio cells. This can be required frequently if the mobile radio subscriber device 105 is moving through the coverage area of the mobile radio communication system at a high speed. A handover from one mobile radio cell to another mobile radio cell typically requires several steps (for example a message exchange between the mobile radio terminal 105 and the E-UTRAN 101) which in each case requires a certain minimum time (a certain minimum time expenditure).

For example, it may first be necessary in the case of a change of mobile radio cells that the mobile radio terminal detects whether another mobile radio cell than that in which it is currently located exists and that it carries out radio measurements of this new mobile radio cell, for example the quality of reception of signals which are sent out by the base station which operates the new mobile radio cell. If the mobile radio terminal has found on the basis of such measurements, for example, that the new mobile radio cell is suitable for a handover, it is necessary, for example, that the mobile radio terminal requests a handover to the new mobile radio cell from the access network, the E-UTRAN 101 in the above example. Finally, it may be necessary, for example, that the radio access network assigns the new mobile radio cell to the mobile radio terminal, for example signals to the mobile radio terminal that it is allocated to the new mobile radio cell from now on and should communicate with the corresponding base station and, for example, by using the corresponding scrambling code, with the radio access network.

A handover between a first mobile radio cell (cell B) 201 and a second mobile radio cell (cell A) 202 will be explained more precisely in the text which follows, referring to FIG. 3.

Figure 3:
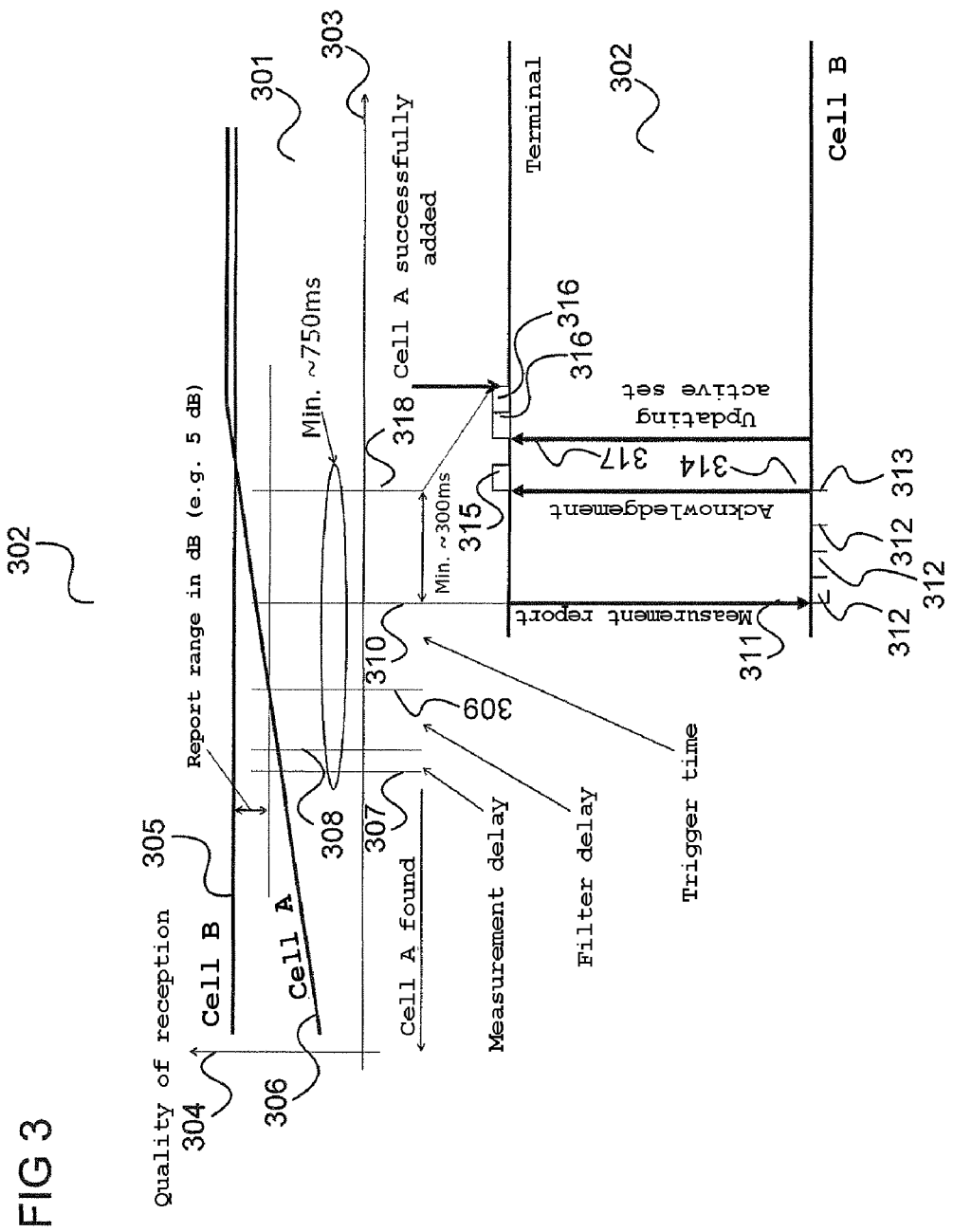
FIG. 3 shows a diagram of received field strength and a message flowchart.

FIG. 3 shows a diagram of received field strength 301 and a message flowchart 302.

In the diagram of received field strength 301 in which time is plotted along a first axis 303 (x axis) and the received field strength is plotted along a second axis (y axis) 304, the received field strength for the first mobile radio cell is identified by a first graph 305 and that for the second mobile radio cell is identified by a second graph 306. In this arrangement, the graphs 305, 306 show the variation of the received field strength of signals which are allocated to the respective mobile radio cell, that is to say, for example, of control signals which are sent out by a base station for operating the respective mobile radio cell (e.g. pilot signals). In this context, the variation of the quality of reception is shown in time and changes depending on how the mobile radio terminal which measures the quality of reception or receives signals with the quality of reception shown is moving through the first mobile radio cell and the second mobile radio cell, assuming in this example that the mobile radio terminal is moving out of the first mobile radio cell and into the second mobile radio cell. In this case, it is assumed that the first mobile radio cell and the second mobile radio cell have a large area of overlap and correspondingly the quality of reception of the second mobile radio cell, shown by the second graph 306, already increases before the quality of reception of the first mobile radio cell, shown by the first graph 305, (significantly) decreases.

In this example, it is assumed that the mobile radio terminal has detected the presence of the second mobile radio cell early due to the increase in quality of reception of the second mobile radio cell and thus already knows of the presence of the second mobile radio cell at a first time 307.

After a measurement delay or report delay, for example in the physical layer (layer 1) of the mobile radio terminal, of, for example, approximately 50 ms (the time interval between the first time 307 and a second time 308), components of the higher layers are informed of the presence of the second mobile radio cell at the second time 308.

After a filter delay, for example in the network layer (layer 3), of, for example, approximately 200 ms, the mobile radio terminal checks at a third time 309 up to a fourth time 310 whether a handover to the second mobile radio cell should be carried out. For example, the second mobile radio cell must meet a particular quality criterion for a particular period of time, for example the period of time between the third time 309 and the fourth time 310, for example be the best cell for a handover according to one criterion. The time between the third time 309 and the fourth time 310 is, for example, between 100 ms and 1280 ms, typically approximately 200 ms.

At a fourth time 310, the message exchange, shown in the message flowchart 302, between the mobile radio terminal which, for example, corresponds to the mobile radio terminal 105, and the radio access network which, for example, corresponds to the E-UTRAN 101, begins in this example.

In 311, the mobile radio terminal sends to the radio access network a report about the radio measurements of the second mobile radio cell and a request for a handover of the mobile radio terminal to the second mobile radio cell. This requires, for example, three PDUs (packet data units) 312 which require about 120 ms (40 ms per PDU) and is followed by a processing delay 313 of approx. 50 ms at the network end.

In 314, the radio access network sends an acknowledgement to the mobile radio terminal which requires, for example, a PDU 315 and thus 40 ms.

Following this, the active set, that is to say the set of mobile radio cells in which the mobile radio terminal is registered and which the mobile radio terminal can use for communication with the radio access network, is updated in that the second mobile radio cell is added in 317. This requires, for example, two PDUs 316 and thus, for example, 80 ms, assuming that a PDU requires 40 ms transmission time.

Following this, the handover is successfully concluded at a fifth time 318 which is about 300 ms after the fourth time 310. The handover procedure thus typically requires at least approx. 750 ms.

The message exchange shown in the message flowchart 302 was carried out by the mobile radio terminal using the first mobile radio cell, i.e. whilst being registered in the first mobile radio cell.

It is only after a successful handover (i.e. adding the second mobile radio cell to the active set of the mobile radio terminal) that the mobile radio terminal can also communicate with the radio access network by using the second mobile radio cell. In this example, the handover could be concluded successfully since the quality of reception of the first mobile radio cell, represented by the first graph 305, was good enough for the duration of the handover procedure so that the handover procedure including the performance of radio measurements of the second mobile radio cell and the performance of the message exchange shown in the message flowchart 302 could be carried out completely.

However, a problem may occur if two adjacent radio cells overlap only in a small area (or even do not overlap at all) and thus the quality of reception of a mobile radio cell, when the mobile radio terminal is moving out of the mobile radio cell, decreases very rapidly before the quality of reception of the mobile radio cell into which the mobile radio terminal is moving increases or has been detected shortly after the mobile radio cell into which the mobile radio terminal is moving.

This may be the case, for example, in the first mobile radio cell 201 and the second mobile radio cell 202 if these are arranged as illustrated in FIG. 2 as will be explained in the text which follows.

Figure 4:
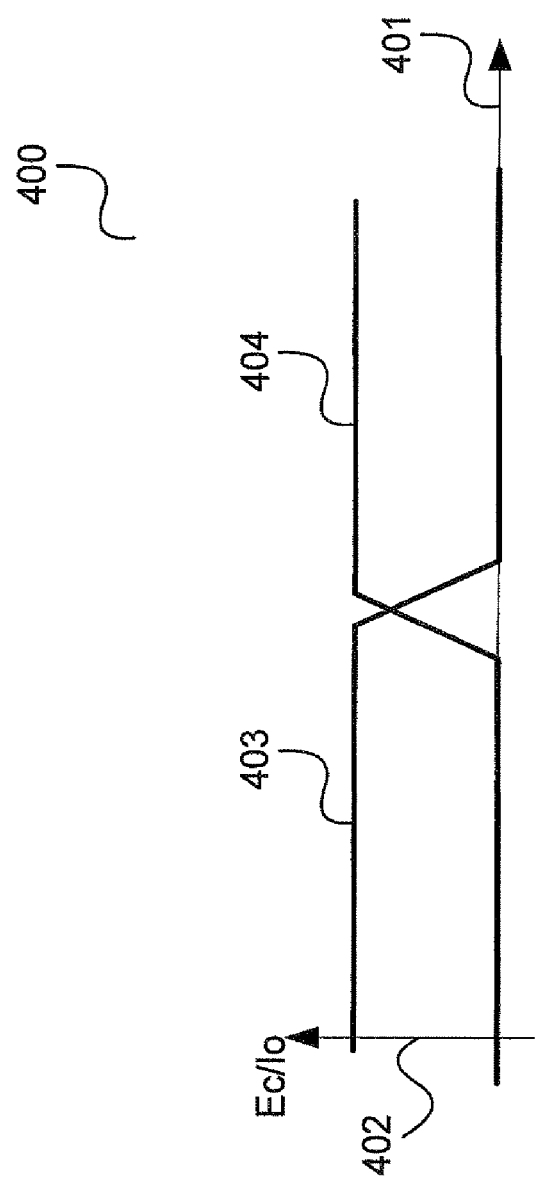
FIG. 4 shows a diagram of the quality of reception according to one embodiment.

FIG. 4 shows a possible variation of the qualities of reception of the first mobile radio cell 201 and of the second mobile radio cell 202.

FIG. 4 shows a diagram of the quality of reception 400 according to one embodiment.

As in the diagram of the quality of reception 301, shown in FIG. 3, time is plotted towards the right along a first axis (x axis) 401 and the quality of reception is plotted along a second axis (y axis) 402 towards the top. In this context, the quality of reception is, for example, the ratio of the energy of the pilot signal for the respective mobile radio cell to the total energy which is received by the mobile radio terminal, for example in decibel. In this example, it is assumed that the quality of reception of the first mobile radio cell decreases shortly after the quality of reception of the second mobile radio cell rises, and reaches a very low value (for example −25 dB) before the quality of reception of the second mobile radio cell has reached a good value (for example −5 dB). This occurs, for example, when the mobile radio terminal is moving on the first lane 204 in FIG. 2 from the left to the right.

Figure 5:
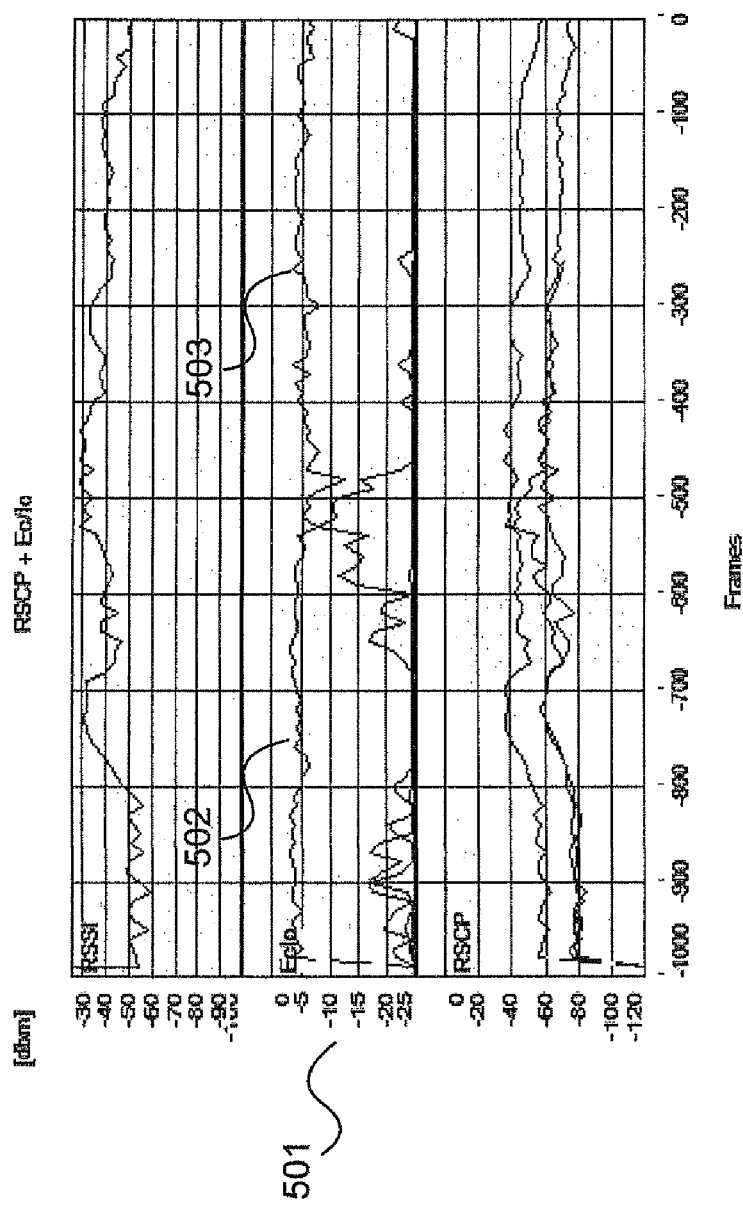
FIG. 5 shows measurement results for mobile radio cells according to one embodiment.

Illustrative values for the quality of reception are shown in FIG. 5.

FIG. 5 shows measurement results for mobile radio cells according to one embodiment.

In a diagram 501, the quality of reception of a first mobile radio cell, which, for example, corresponds to the first mobile radio cell 201 in FIG. 2, is represented by means of a first graph 502, and the quality of reception of a second mobile radio cell which, for example, corresponds to the second mobile radio cell 202 in FIG. 2, is represented by means of a second graph 503.

Similarly to FIG. 4, the quality of reception of the first mobile radio cell decreases shortly after the quality of reception of the second mobile radio cell increases in this example. In this context, the time is specified in frames, one frame corresponding to, for example, 10 ms.

Analogously to FIG. 2, the time is plotted from left to right and the quality of reception from bottom to top (in dBm).

Figure 6:
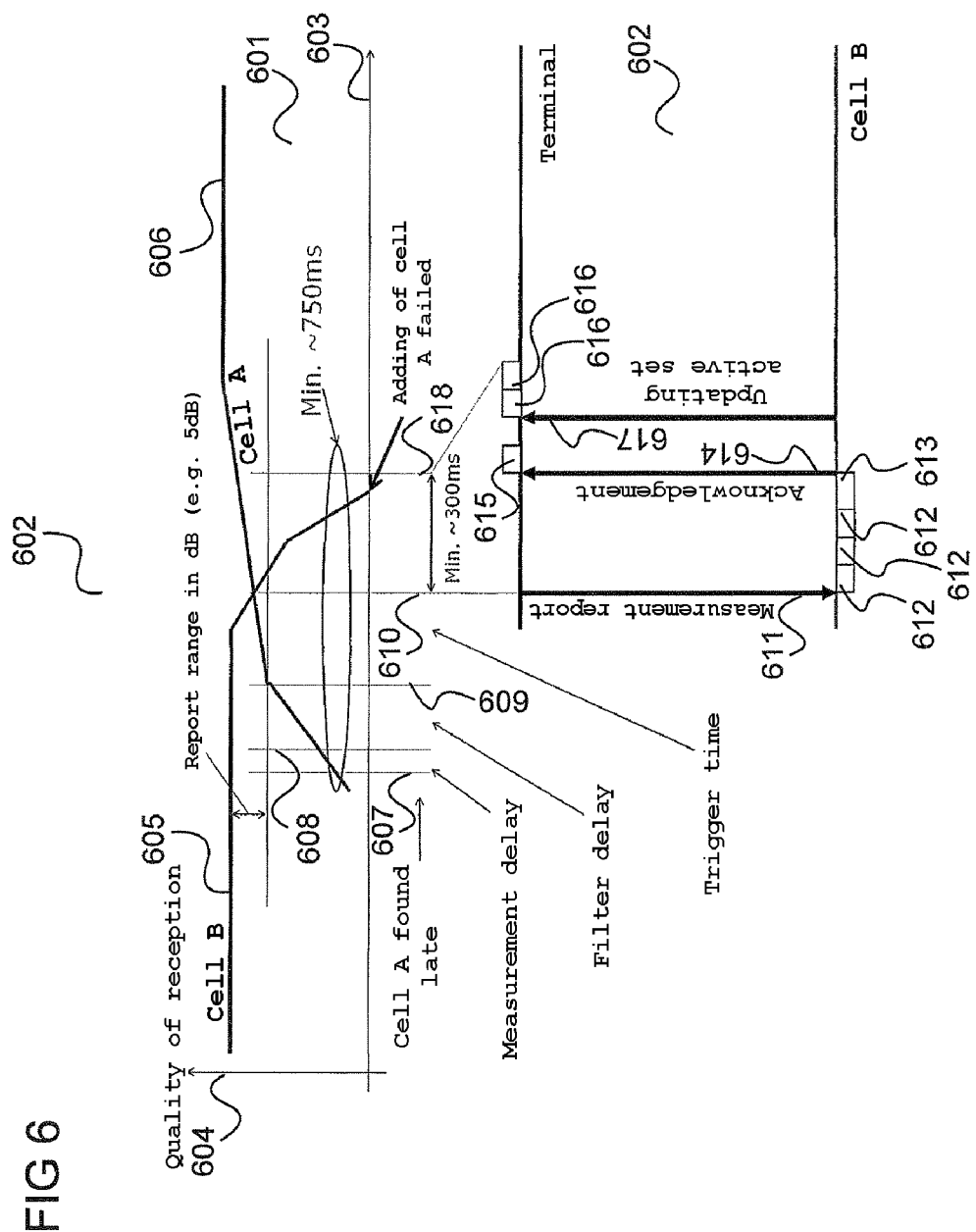
FIG. 6 shows a diagram of the quality of reception and a message flowchart.

In such a scenario, that is to say in such an arrangement of mobile radio cells having a small range of overlap, that is to say a small range in which the quality of reception of both mobile radio cells is good so that the quality of reception is correspondingly only good for a short time when a mobile radio terminal leaves one mobile radio cell and moves into the other mobile radio cell, can lead to problems during the handover as is illustrated in FIG. 6.

FIG. 6 shows a diagram of quality of reception 601 and a message flowchart 602. Analogously to the diagram of quality of reception 301 which is shown in FIG. 3, the diagram of quality of reception 601 shows in a first graph 605 the variation of the quality of reception in the time, which is plotted along a first axis 603, of a first mobile radio cell which, for example, corresponds to the first mobile radio cell 201 in the representation of FIG. 2, and a second graph 606 shows the variation of the quality of reception of a second mobile radio cell which, for example, corresponds to the mobile radio cell 202 in FIG. 2. The quality of reception is plotted along a second axis 604 as above, for example the value of the energy of the received pilot signal of the respective cell in proportion to the received total energy in dBm.

A first time 607, a second time 608, a third time 609, a fourth time 610 and a fifth time 611 in each case correspond to the times 307, 308, 309, 310, 318 which are described above with reference to FIG. 2. Similarly, the message flow represented in the message flowchart 602 progresses analogously to the message flow, described with reference to FIG. 3, of the message flowchart 302.

Thus, it is assumed, analogously to the sequence explained above with reference to FIG. 3, that the handover procedure requires about 750 ms. In the present example, however, it is assumed that the quality of reception of the first mobile radio cell, represented by the first graph 605, drops too early to a value which is too low, for example −25 dBm, for being able to terminate the handover procedure successfully. For example, the quality of reception of the first cell drops, as shown in the diagram of the quality of reception 601, before the fifth time 611 to a value which is too low so that the mobile radio terminal can no longer receive the acknowledgement of the radio access network in 614 and the updating of the active set in 615 by means of the first mobile radio cell. In this case, the handover procedure thus fails and the mobile radio terminal can lose the connection to the radio access network since it can no longer use the first mobile radio cell, but the handover procedure to the second mobile radio cell, that is to say the addition of the second mobile radio cell to the active set of the mobile radio terminal could not be ended and therefore the communication link to the radio access network cannot be continued by means of the second mobile radio cell.

In other words, it may happen that a base station or also a number of base stations are placed in such a way that adjoining mobile radio cells (or mobile radio cell sectors) only overlap by a small amount. This case is also called cell transition or crossing cell (X-cell) as is shown, for example, in FIG. 2 in which this case occurs since the base station 200 is placed very close to the lanes 204, 205. As explained, it may happen in this case that there is not enough time for a mobile radio terminal to perform the handover procedure since the quality of reception of a cell deteriorates too rapidly and the quality of reception of the other cell into which the mobile radio terminal is moving improves too slowly, that is to say, in other words, the other mobile radio cell appears too late from the point of view of the mobile radio terminal.

It thus depends on the speed of the mobile radio terminal and on the placement of the mobile radio cells whether the handover procedure can be performed successfully. As explained, a breakdown of connection between the mobile radio terminal and the radio access network (and thus also the core network) typically occurs in the case of a failed handover procedure which is typically very annoying for the user of the mobile radio terminal. In fact, such crossing cells are a very frequent reason for connection breakdowns.

One possibility, for example in the scenario shown in FIG. 2, would be to place another base station in the vicinity, for example in the vicinity on the other side of the road so that the critical area, that is to say the area in which the quality of reception of a cell already decreases when the quality of reception of the other cell has only just begun to increase, is covered by a mobile radio cell which is operated by the additional base station. However, an additional base station is associated with costs for the operator of the mobile radio communication system and also requires additional backbone links (for example links to the core network) and, for example, transmission capacity to the core network.

From the point of view of radio transmission, an additional base station also generates much (possibly unnecessary) interference which can be very undesirable especially in communication systems according to UMTS or LTE in which the transmission capacity is restricted due to the interference.

In the text which follows, a communication arrangement which, according to one embodiment, is used for avoiding communication link breakdowns due to failed handover procedures will be explained with reference to FIG. 7.

Figure 7:
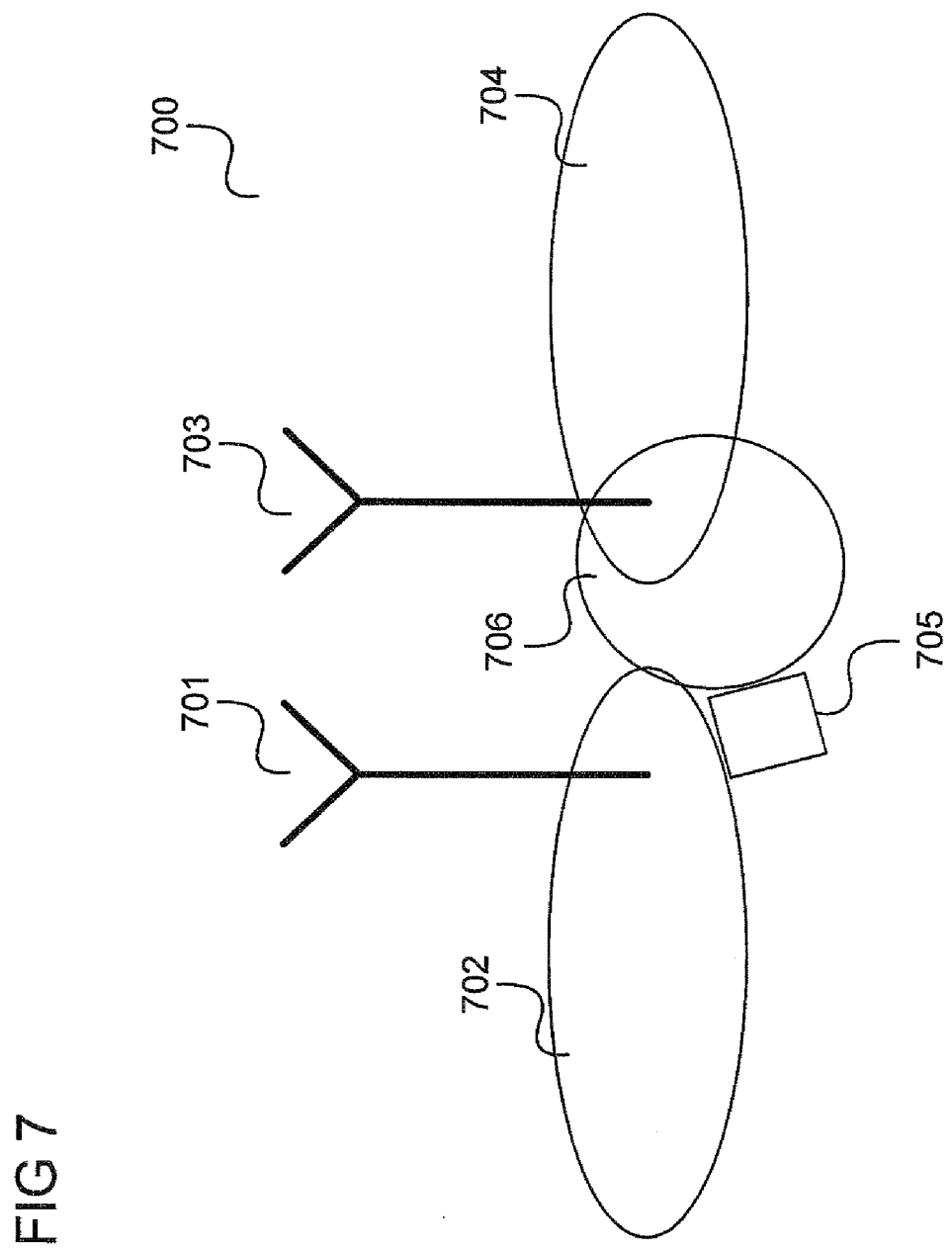
FIG. 7 shows a communication arrangement according to one embodiment.

FIG. 7 shows a communication arrangement 700 according to one embodiment.

The communication arrangement 700 has a first antenna 701 for transmitting signals to the coverage area of a first mobile radio cell 702. The communication arrangement also has a second antenna 703 for transmitting signals to the coverage area of a second mobile radio cell 704. The communication arrangement 700 also has a signal radiating device 705 which is arranged for radiating signals, which are sent out by the first antenna 701, into an area 706 which is associated with the coverage area of the first mobile radio cell 702 and which overlaps the coverage area of the second mobile radio cell 704.

To illustrate, in one embodiment, the coverage area of the first mobile radio cell 702 is moved into the coverage area of the second mobile radio cell 704, for example in such a manner that when the first mobile radio cell 702 is left and the second mobile radio cell 704 is entered (for example by a mobile radio communication terminal), a seamless transition is performed from the coverage area of the first mobile radio cell 702 into the area into which the signal radiating device 705 radiates the signals and (possibly in the case of further movement) into the area of overlap between the area into which the signal radiating device 705 radiates the signals and the coverage area of the second mobile radio cell 704. Thus, it is possible to achieve, for example, that a mobile radio communication terminal moving in this manner can receive for a time both signals which are sent out by the first antenna 701 (and by the signal radiating device 705) and signals which are sent out by the second antenna 702 and, for example, can successfully perform a handover procedure from the first mobile radio cell 702 to the second mobile radio cell 704.

The coverage area of the first mobile radio cell and the coverage area of the second mobile radio cell, for example, do not overlap in the area. In one embodiment, each part of the area is located in the coverage area of the first mobile radio cell and/or in the coverage area of the second mobile radio cell (wherein the coverage area of the first mobile radio cell and the coverage area of the second mobile radio cell can overlap so that a part of the area is located in the coverage areas of both mobile radio cells). In other words, in one embodiment, the area does not increase the network coverage (e.g. not the coverage by the coverage area of the first mobile radio cell and the coverage area of the second mobile radio cell). In one embodiment, the area therefore has no effect for a stationary subscriber device but is only of importance for moving subscriber devices which are moving quickly out of the coverage area of the first mobile radio cell and into the coverage area of the second mobile radio cell.

The communication arrangement can also have one or several base stations, the first antenna and the second antenna being antennas of the one or several base stations.

The communication arrangement can have a mast (for example a base station mast) on which the first antenna and the second antenna are mounted, the signal radiating device being mounted on the mast.

In one embodiment, the signal radiating device is an active transmitting device.

The communication arrangement can have a signal generating device which supplies the same signals to the antenna and to the signal radiating device for sending out by means of the antenna and for sending out by means of the signal radiating device. Thus, for example, a radio signal generator can be provided which, for example, according to data which it receives from other components of the mobile radio network, generates a radio signal which it supplies to the antenna and to the signal radiating device for sending out. The signal generating device is, for example, a part of the base station which operates the first mobile radio cell.

The signal radiating device has, for example, a (third) antenna.

According to one embodiment, the signal radiating device is passive.

For example, the signal radiating device is a reflector.

In one embodiment, the communication arrangement also has a mast on which the first antenna and the second antenna are mounted, the reflector being arranged remote from the mast. In other words, the reflector is thus not arranged or attached directly on the mast but arranged at a certain distance independently from the antennas. For example, the reflector is arranged in the coverage area of the first mobile radio cell.

In one embodiment, the communication arrangement also has a mast on which the first antenna and the second antenna are mounted, and the reflector is arranged on the mast.

In one embodiment, the reflector is arranged (at least partially) in the main direction of radiation of the first antenna. In other words, the reflector is arranged, for example, in a direction from the first antenna so that it is arranged at least partially in a sector or cone in which the first antenna mainly radiates.

The signal radiating device can be arranged for radiating the signals in such a manner that the area is an area which does not exceed a predetermined maximum extent. To illustrate, the signal radiating device, in one embodiment, radiates in a limited area (e.g. small area in comparison with the cell size of the cells of the mobile radio network).

The signal radiating device can be arranged for radiating the signals in such a manner that the area is an area which is not less than a predetermined minimum extent.

The signal radiating device can also be arranged for radiating the signals in such a manner that the area is an area in which the signal strength of the signals sent out by the first antenna is below a predetermined first threshold value.

The signal radiating device can also be arranged for radiating the signals in such a manner that the area is an area in which the signal strength of the signals sent out by the second antenna is below a predetermined first threshold value.

The area is located, for example, in the vicinity of the first antenna, for example closer to the first antenna than parts of the first coverage area (e.g. parts of the first coverage area located on the edge of the first coverage area). Thus, the area does not increase, for example, the geographic extent of the first coverage area on its outer edge (i.e. facing away from the base station) but is used for coverage in the vicinity of the base station.

In one embodiment, the signals sent out by the first antenna are spread by means of a first scrambling code and the signals sent out by the second antenna are spread by means of a second scrambling code, the first scrambling code and the second scrambling code being different.

In one embodiment, the signals sent out by the first antenna are spread by means of a first scrambling code and the signals radiated by the signal radiating device are also spread by means of the first scrambling code.

In one embodiment, the signals are control signals, for example mobile radio network control signals, e.g. pilot signals. The signals include, for example, signals for performing a handover procedure, that is to say, for example, signals which are required for a successful performance of a handover procedure. In one embodiment, the signals only include control signals. The signals are, for example, free of user data, e.g. payload data which are exchanged by users (i.e. mobile radio subscribers).

According to one embodiment, the signal radiating device is an active device. This will be explained in the text which follows, referring to FIGS. 8 to 11.

Figure 8:
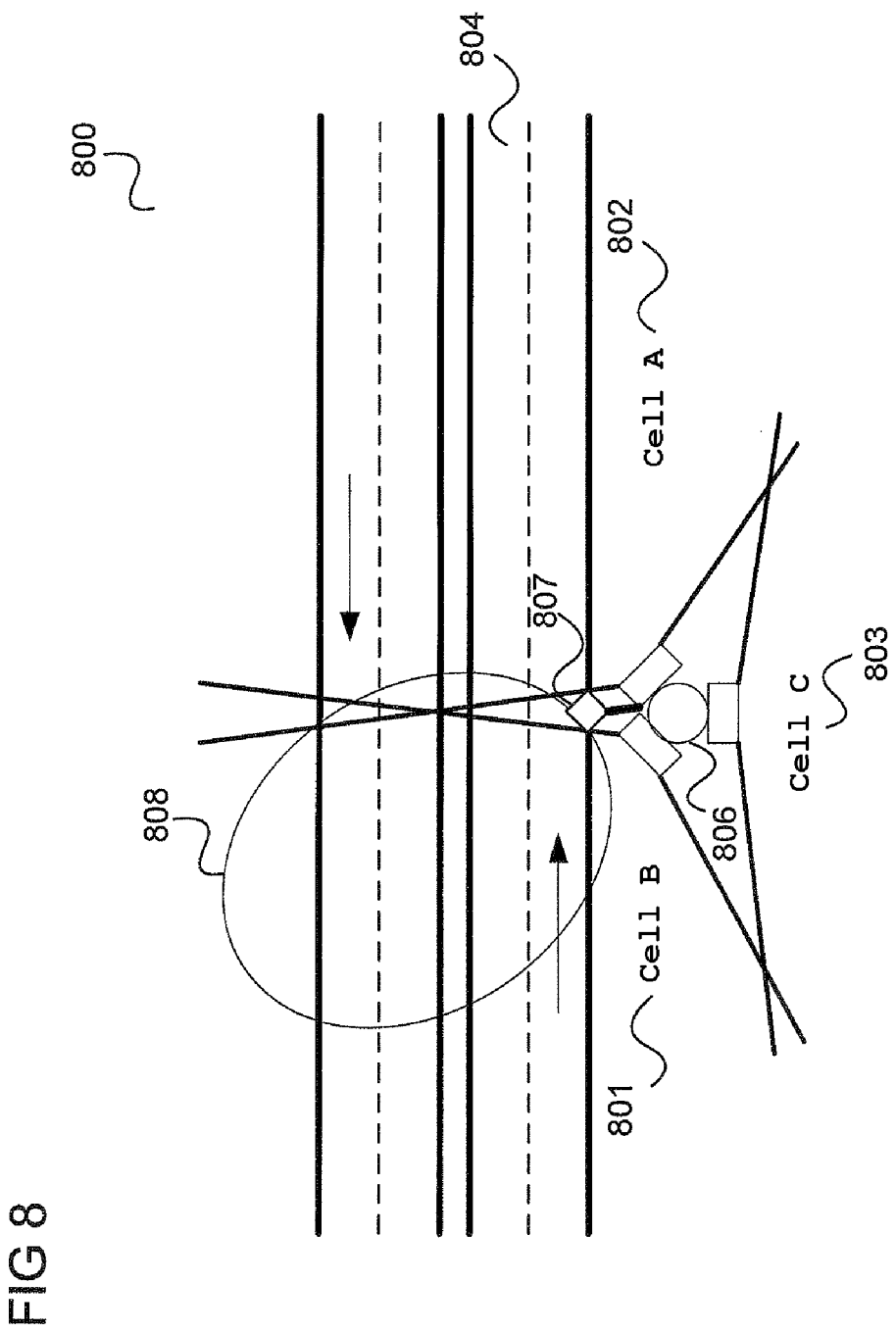
FIG. 8 shows a communication arrangement according to one embodiment.

FIG. 8 shows a communication arrangement 800 according to one embodiment.

Analogously to FIG. 2, the communication arrangement 800 includes a base station 806 which operates a first mobile radio cell 801, a second mobile radio cell 802 and a third mobile radio cell 803. The first mobile radio cell 801 corresponds to the first mobile radio cell 201 from FIG. 2 and the second mobile radio cell 802 corresponds to the second mobile radio cell 202 from FIG. 2. The first mobile radio cell 801 and the second mobile radio cell 802 thus have a small area of overlap which, as explained with reference to FIG. 2, could lead to connection breakdowns. In this case, however, an active signal radiating device 807 is provided which supplies an area 808 with the signals of the second mobile radio cell 802, that is to say with the signals which are sent out by the base station 806 in the coverage area of the second mobile radio cell, for example by using the scrambling code allocated to the second mobile radio cell.

The area 808 can be considered as a microcell which extends the second mobile radio cell 802 into the first mobile radio cell 801 within a small area around the cell transition which is formed by the first mobile radio cell 801 and the second mobile radio cell 802, or, in other words, by the base station 806.

According to one embodiment, the area 808 is not a separate mobile radio cell but only an extension of the second mobile radio cell 802. For example, no separate scrambling code is allocated to the area 808 but the active signal radiating device 807 sends the signals by using the scrambling code which is also allocated to the second mobile radio cell 802. Due to the extension of the second mobile radio cell 802 into the first mobile radio cell 801, the second mobile radio cell 802 can be detected earlier by a mobile radio terminal which is moving from the first mobile radio cell 801 into the second mobile radio cell 802, that is to say, for example, moving from left to right along the first lane 804, and thus the handover procedure can be initiated early by the mobile radio terminal and be performed correspondingly before the quality of reception of the first mobile radio cell 801 has fallen to too low a value for ending the handover procedure.

Figure 9:
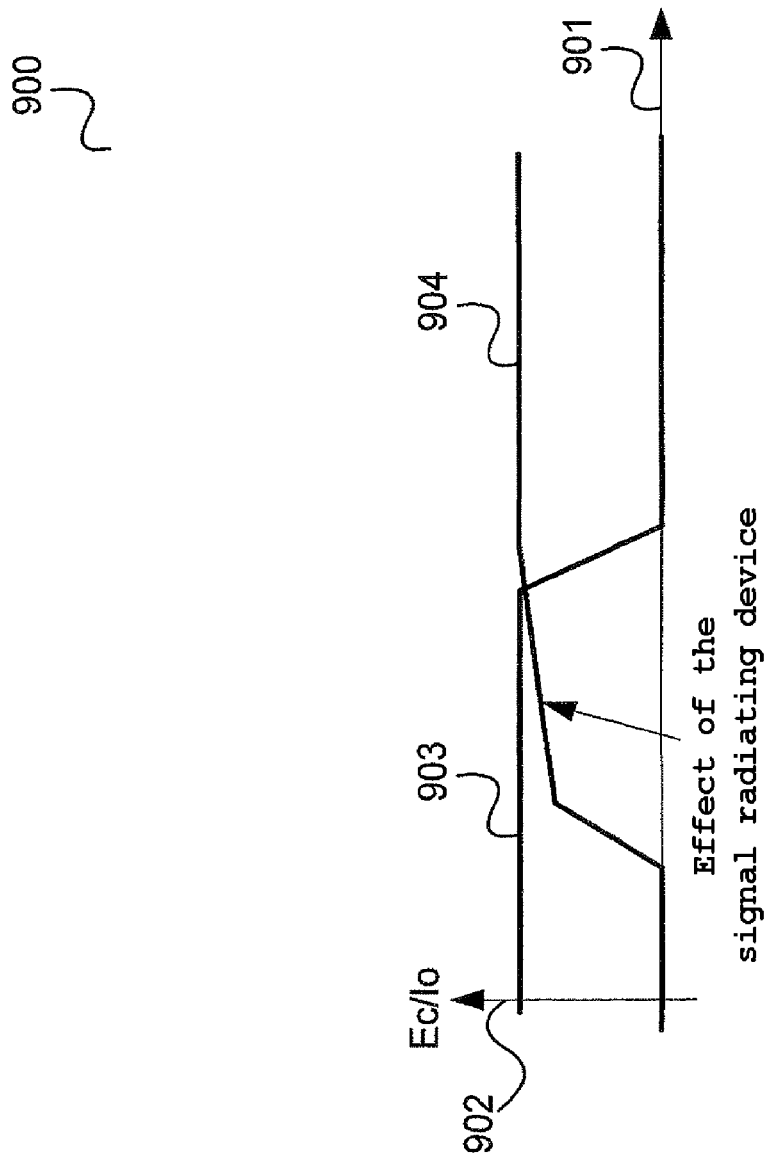
FIG. 9 shows a diagram of the quality of reception according to one embodiment.

The variation of the quality of reception 801 and of the second mobile radio cell 802 within the time for a mobile radio terminal which is moving from left to right in the scenario of FIG. 8 is shown in FIG. 9.

FIG. 9 shows a diagram of the quality of reception 900 according to one embodiment. Analogously to FIG. 4, the time is plotted from left to right along a first axis 901 and the quality of reception is plotted along a second axis 902 and a first graph 903 shows the variation of the quality of reception of the first mobile radio cell 801 with time and a second graph 904 shows the variation of the quality of reception of the second mobile radio cell 802 with time. In comparison with the diagram of the quality of reception 400 from FIG. 4, it can be seen that the active signal radiating device 807 has the effect that the quality of reception of the second mobile radio cell 802 begins to rise earlier and thus the handover procedure can be initiated earlier by the mobile radio communication terminal, for example the presence of the second mobile radio cell 802 can be detected earlier and thus a handover can also be requested earlier from the radio access network.

In another embodiment, the coverage area of the first mobile radio cell 801 is extended into the second mobile radio cell 802 by the active signal radiating device 807. This will be described with reference to FIG. 10 in the text which follows.

Figure 10:
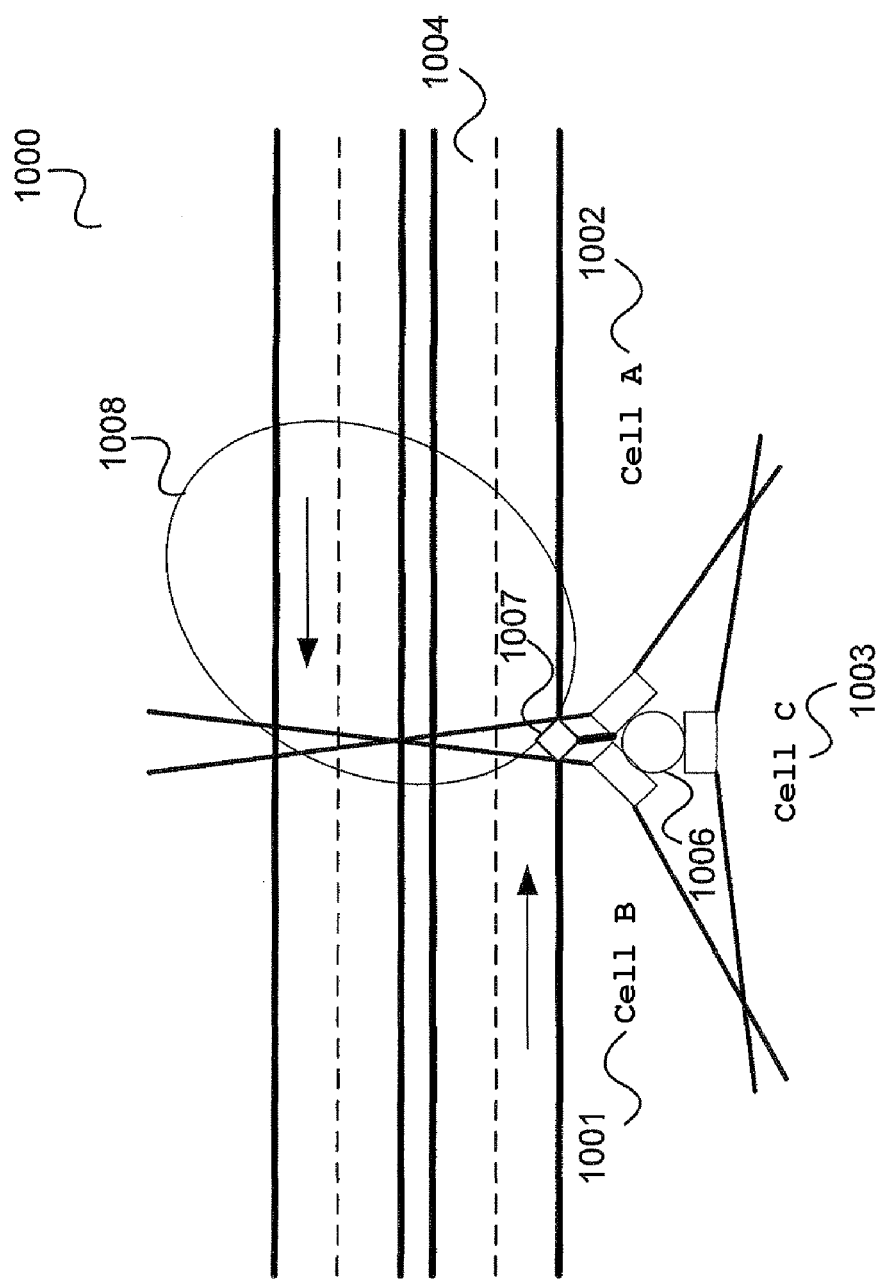
FIG. 10 shows a communication arrangement according to one embodiment.

FIG. 10 shows a communication arrangement 1000 according to one embodiment. Analogously to FIG. 8, the communication arrangement 1000 has a base station 1006, a first mobile radio cell 1001, a second mobile radio cell 1002, a third mobile radio cell 1003, an active signal radiating device 1007 and an area 1008, the area 1008 being an extension of the first mobile radio cell 1001, that is to say the active signal radiating device 1007 sends the signals of the first mobile radio cell 1001 into the area 1008. Thus, the area of the first mobile radio cell 1001 is illustratively extended by the signal radiating device 1007 into the coverage area of the second mobile radio cell 1002.

Figure 11:
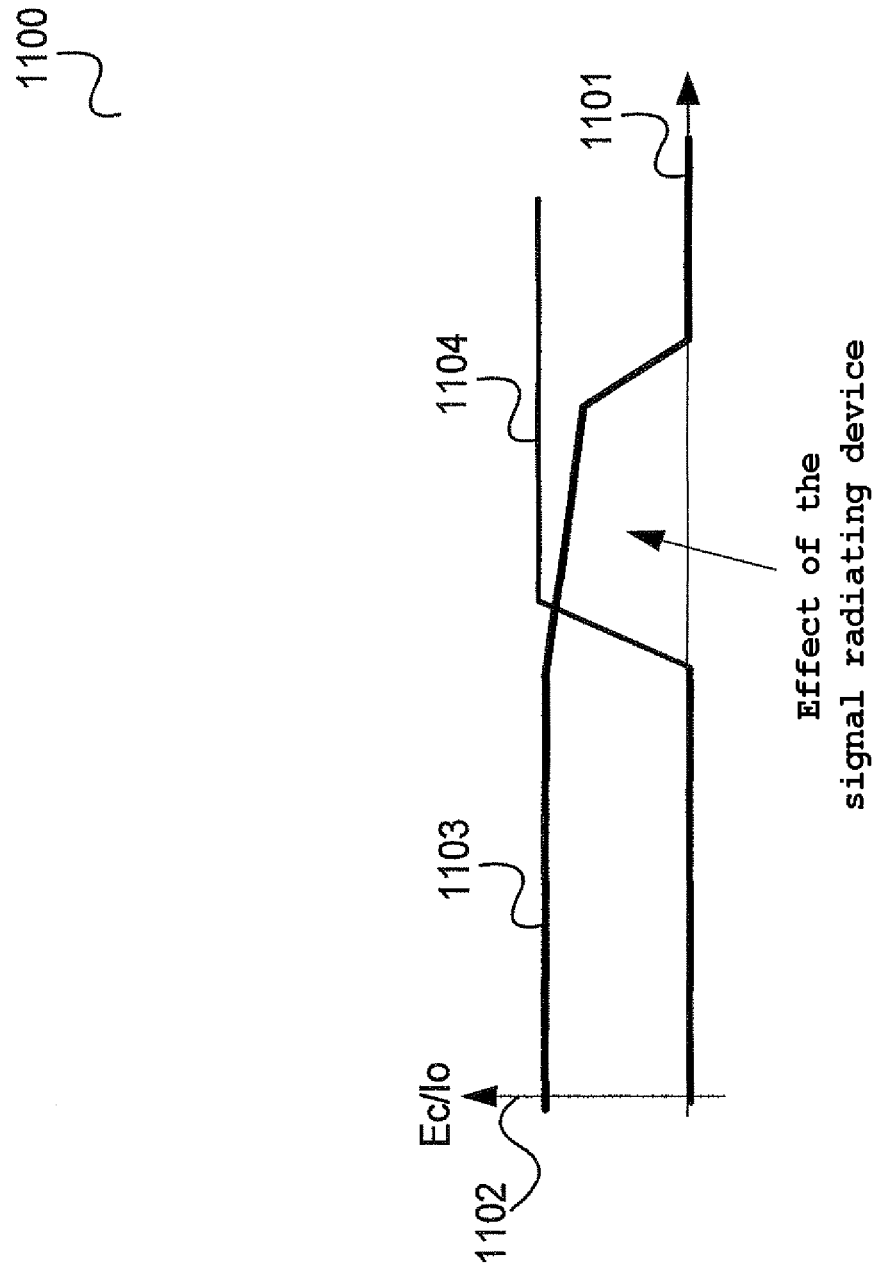
FIG. 11 shows a diagram of the quality of reception according to one embodiment.

The corresponding variation of the quality of reception for a communication terminal which is moving from left to right in the scenario of FIG. 10, for example on the first lane 1004, is shown in FIG. 11.

FIG. 11 shows a diagram of the quality of reception 1100 according to one embodiment.

Analogously to FIG. 9, the quality of reception of the first mobile radio cell 1001 is represented by means of a first graph 1103 and the quality of reception of the second mobile radio cell 1002 is represented by means of a second graph 1104, time being plotted along a first axis 1101 and the quality of reception being plotted along a second axis 1102.

Comparison with the diagram of the quality of reception 400 from FIG. 4 shows that the extension of the first mobile radio cell 1001 by the signal radiating device in the form of the area 1008 into the second mobile radio cell 1002 has the effect that the quality of reception of the first mobile radio cell 1001, as shown by the first graph 1103, decreases to a greater extent only at a later time so that the mobile radio terminal, after detection of the second mobile radio cell 1002, in the case of an increase in the quality of reception of the second mobile radio cell 1002 has more time to end the handover procedure in comparison with the scenario from FIG. 2 since the mobile radio communication terminal can receive messages from the radio access network for longer, for example receive the acknowledgement message in 314 or updating of the active set in 315 in the message flow shown in FIG. 3 for longer.

To illustrate, the mobile radio terminal can thus receive a handover command from the radio access network for longer and the handover procedure can thus be successfully ended with a higher probability.

According to one embodiment which can be considered to be a combination of the embodiments of FIG. 8 and FIG. 10, both the first mobile radio cell 801, 1001 is extended into the second mobile radio cell 802, 1002 and the second mobile radio cell 802, 1002 is extended into the first mobile radio cell 801, 1001.

Assuming a speed of movement of 120 km/h=33 m/s of the communication terminal, only an extension of one of the mobile radio cells 801, 1001, 802, 1002 of 50 m is required in order to increase the time budget for the handover procedure by 1.5 s which is typically sufficient. In one embodiment in which such a slight extension of the area 808, 1008 is sufficient, only a low transmitting power of the active signal radiating device 807, 1007 is required or the signal radiating device can transmit target-oriented into the area 808, 1008 so that only little interference is produced for the other mobile radio cells of the communication system due to the active signal radiating device 807, 1007.

The active signal radiating device 807, 1007, which can be considered to be a microcell base station, can be implemented, for example, by means of a repeater and can be connected by means of a cable to the base station 806, 1006 in one embodiment in which it is arranged close to the base station 806, 1006. The active signal radiating device 807, 1007 can be arranged also in the coverage area of a mobile radio cell which is operated, for example, by the base station 806, 1006, for example placed in the coverage area of the mobile radio cell 802, 1001, the coverage area of which it extends, and connected by means of the base station 806, 1006 via the air interface, that is to say by means of a radio communication link. If the active signal radiating device 807, 1007 is placed, for example, in the mobile radio cell 802, 1001, the coverage area of which it is intended to extend, it can transmit into the other direction, i.e. in the direction of the other cell 801, 1002 in each case, from the point of view of the base station 806, 1006.

In comparison with a complete base station, the signal radiating device 807, 808 can be implemented very cost-effectively by means of a repeater and only requires little computing capacity and no backhaul links, for example to the core network. The active signal radiating device 807, 808 can be mounted, for example, on the same mast on which the antennas of the base station 806, 1006 are mounted so that no additional space is required for the signal radiating device 806, 1006. Thus, the signal radiating device 807, 1007 can be implemented simply by means of an additional low-power direction antenna which does not radiate in the main direction of radiation of the mobile radio cell 802, 1001 which it is intended to extend but in the direction of the other, adjacent cell 801, 1002.

In one embodiment, the signal radiating device only conveys the downlink signal of the mobile radio cell 802, 1001 which it extends. Uplink signals of both mobile radio cells 801, 802, 1001, 1002 can be combined in the base station 806, 1006.

In another embodiment, a passive signal radiating device, for example a reflector, is used instead of an active signal radiating device 807, 1007. This is illustrated in FIGS. 12 and 13.

Figure 12:
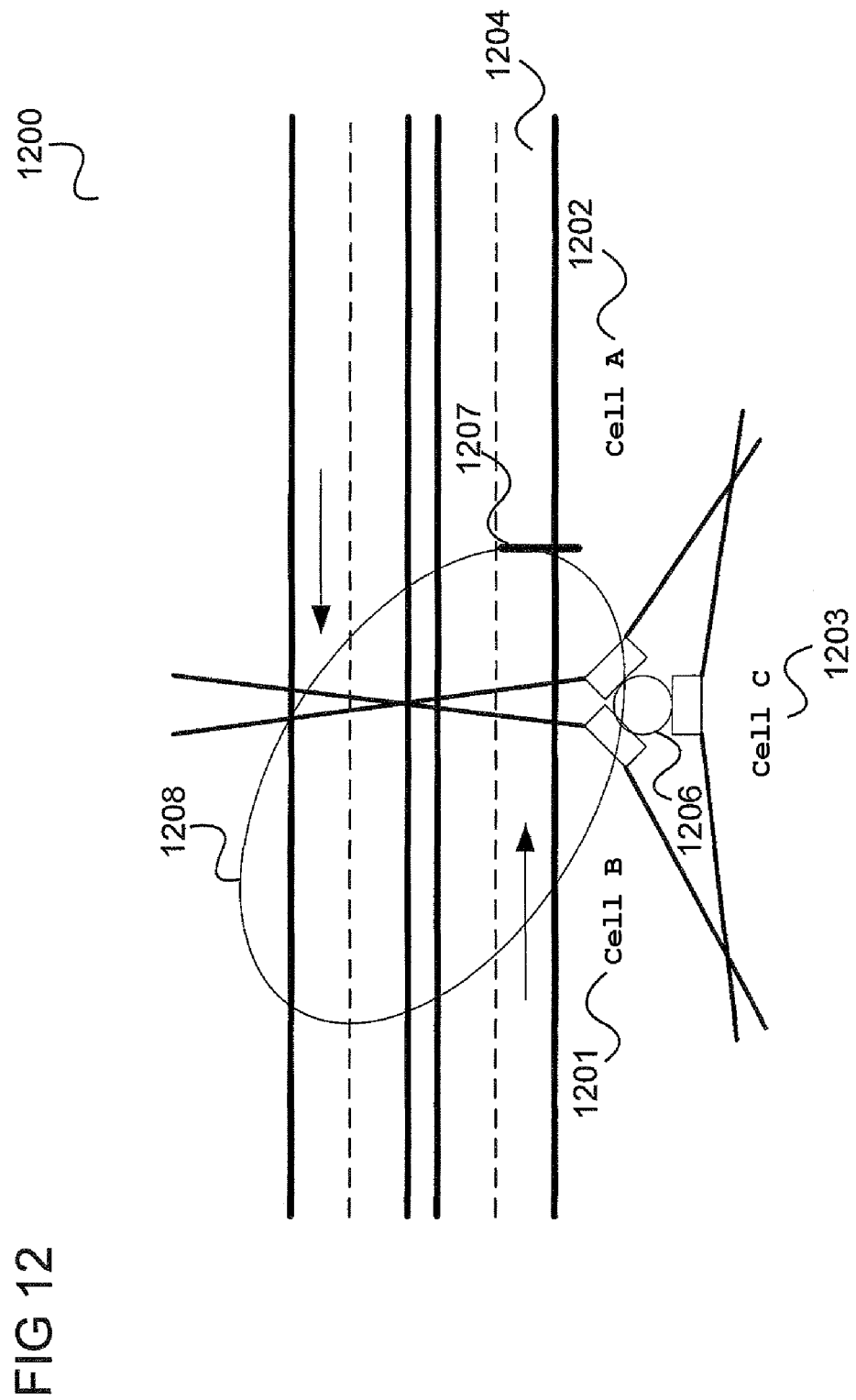
FIG. 12 shows a communication arrangement according to one embodiment.

FIG. 12 shows a communication arrangement 1200 according to one embodiment. Analogously to FIG. 8, the communication arrangement 1200 has a base station 1206 which operates a first mobile radio cell 1201, a second mobile radio cell 1202 and a third mobile radio cell 1203. In an area 1208, an active signal radiating device 1207 of the communication arrangement 1200 radiates signals which, belonging to the second mobile radio cell 1202, are sent out by the base station 1206 into the coverage area of the second mobile radio cell 1202 and thus illustratively extends the second mobile radio cell 1202 into the coverage area of the first mobile radio cell 1201. The effect is thus analogous to the effect of the radiation of the active signal radiating device 807, described with reference to FIG. 8, and a variation of the quality of reception can be achieved for a mobile radio communication terminal which is moving from left to right on the first lane 1204 as is described with reference to FIG. 9.

Analogous to the alternative shown in FIG. 10, the first mobile radio cell 1201 can also be extended into the coverage area of the second mobile radio cell 1202 in the case of a passive signal radiating device being used. This is described with reference to FIG. 13 in the text which follows.

Figure 13:
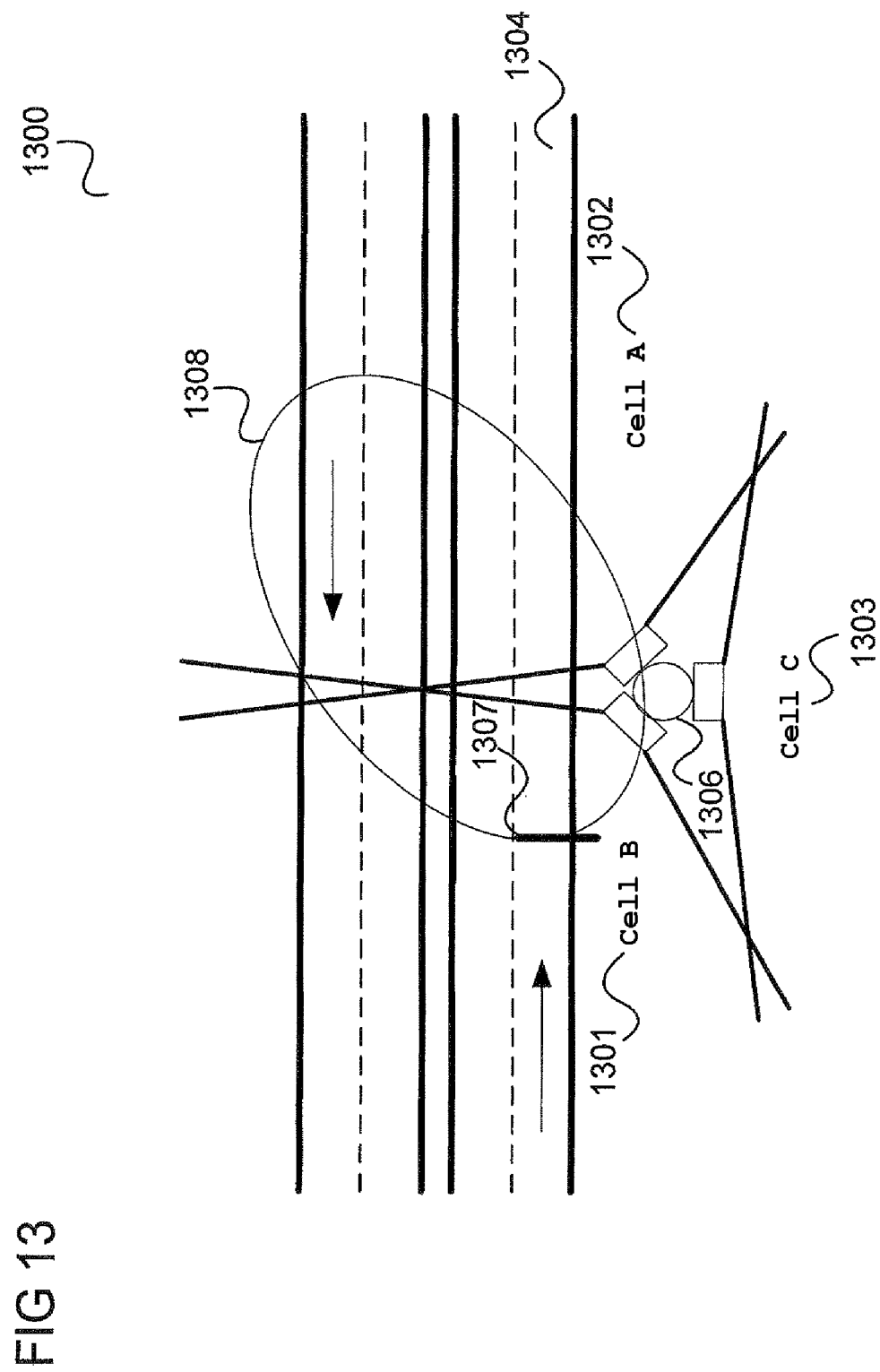
FIG. 13 shows a communication arrangement according to one embodiment.

FIG. 13 shows a communication arrangement 1300 according to one embodiment.

Analogously to FIG. 12, the communication arrangement 1300 includes a base station 1306 which operates a first mobile radio cell 1301, a second mobile radio cell 1302 and a third mobile radio cell 1303.

The communication arrangement 1300 also includes a passive signal radiating device 1307 which radiates signals which are radiated by the base station 1306 belonging to the first mobile radio cell 1301 into the coverage area of the first mobile radio cell 1301, into an area 1308 which extends from the first mobile radio cell 1301 into the coverage area of the second mobile radio cell 1308.

The effect of the passive signal radiating device 1307 is thus like the effect of the active signal radiating device 1007 which is described above with reference to FIG. 10, and a variation of the quality of reception as is described with reference to FIG. 11 can occur for a mobile radio communication terminal which moves from left to right on the first lane 1304.

Analogously to the possibility of arranging two active signal radiating devices which extend both the second mobile radio cell 802, 1002 into the area of the first mobile radio cell 801, 1001 and extend the first mobile radio cell 801, 1001 into the area of the second mobile radio cell 802, 1002, two passive signal radiating devices which extend both the first mobile radio cell 1201, 1301 into the area of the second mobile radio cell 1202, 1302 and extend the coverage area of the second mobile radio cell 1202, 1302 into the coverage area of the first mobile radio cell 1201, 1301 can be provided also in the case of a passive signal radiating device.

Analogously to the above example in which a speed of the communication terminal of 120 km/h=33 m/s is assumed, it is sufficient, for example, if the extent of the area 1208, 1308 along the first lane 1204, 1304 is 50 m in order to increase the time which a communication terminal, which is moving along the first lane 1204, 1304 from left to right, has available for a handover procedure by 1.5 s which is typically sufficient for a normal handover procedure. For such a relatively small extent of the area 1208, 1308, the passive signal radiating device, for example a reflector, can be selected to be relatively small and can focus the signals radiated by it onto a relatively small area so that interference for other mobile radio cells of the mobile radio communication system can be largely avoided.

Dimension and curvature of the reflector can be selected depending on the desired illumination (i.e. depending on shape and/or size of the area 1208, 1308) with the desired signal strength. For example, a reflector with a size of 1 m*1 m can be used at 10 m distance from the base station 1206, 1306 (e.g. from the mast of the base station 1206, 1306) in order to illuminate, for example, an area which extends at 30-50 meters along the direction of the lane. If the reflector is arranged closer to the respective antenna of the base station 1208, 1308, a smaller reflector size can also be selected, for example 10 cm*10 cm. In one embodiment, the reflector is designed in such a manner that it focuses the reflection onto the desired area 1208, 1308 so that interference in the total network (e.g. in other mobile radio cells) is avoided.

The passive signal radiating device 1207, 1307 can, for example, be mounted directly on the mast of the base station 1206, 1306 in the form of a reflector. This is illustrated in FIG. 14.

Figure 14:
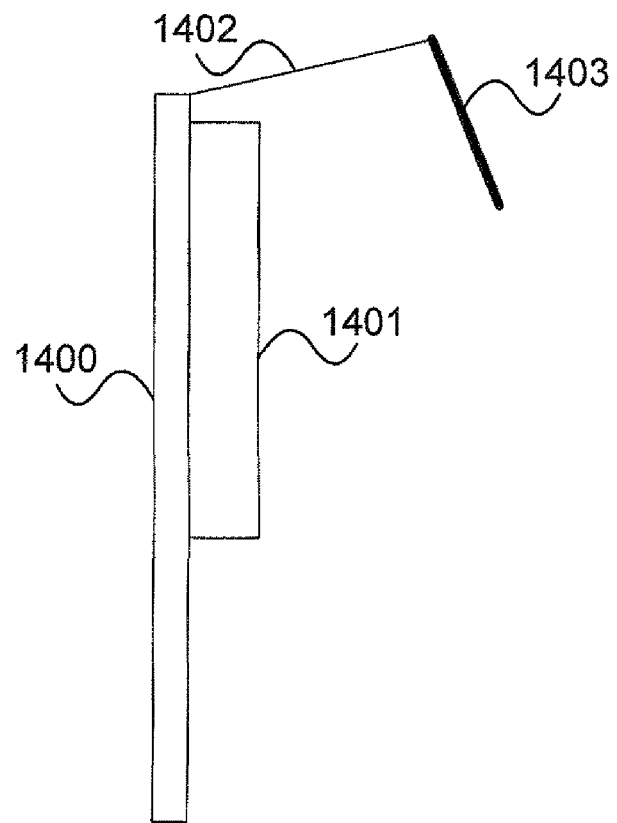
FIG. 14 shows a base station mast according to one embodiment.

FIG. 14 shows a base station mast 1400 according to one embodiment. On the mast 1400, a base station antenna 1401 is mounted by means of which signals are conveyed into a mobile radio cell, for example into the first mobile radio cell 1201, 1301 or the second mobile radio cell 1202, 1302. Furthermore, a reflector 1403 which reflects signals which are radiated by the base station antenna 1401 is mounted on the mast 1400 by means of an attachment 1402. In this example, the reflector 1403 is mounted in such a manner that it radiates the signals which are sent out by the base station antenna 1401, for example in the direction of one of the mobile radio cells 1202, 1301, into the other direction, that is to say, for example, into the coverage area of the adjacent mobile radio cell 1201, 1302 so that the coverage area of the mobile radio cell 1202, 1301, for which the base station antenna 1401 radiates signals, is extended into the area of the adjacent mobile radio cell 1201, 1302 as is described above with reference to FIGS. 12 and 13.

In this context, the reflector 1403 can reflect a part of the signals radiated by the base station antenna 1401, which can be considered as main antenna, which would be radiated beyond the horizon in any case and would thus remain unused.

A possibility for a reflector would be, for example, a metal plate which could be used, for example, as advertising panel which is mounted in the vicinity of the base station 1206, 1306 in the path of the radiation which is radiated by the base station antenna 1401. The reflector can be shaped in such a manner that it reflects the radiation reflected by it into a small area 1208, 1308 in such a manner that this area 1208, 1308 has precisely the size which is required for sufficiently increasing the time budget for a handover procedure. Such reflectors can be produced inexpensively and considerably reduce the robustness with respect to communication breakdowns at cell transitions. A passive signal radiating device 1207, 1307 also requires little maintenance so that the operating costs can be kept low.

In the text which follows, an example of the variation of the quality of reception with a cell transition is explained.

Figure 15:
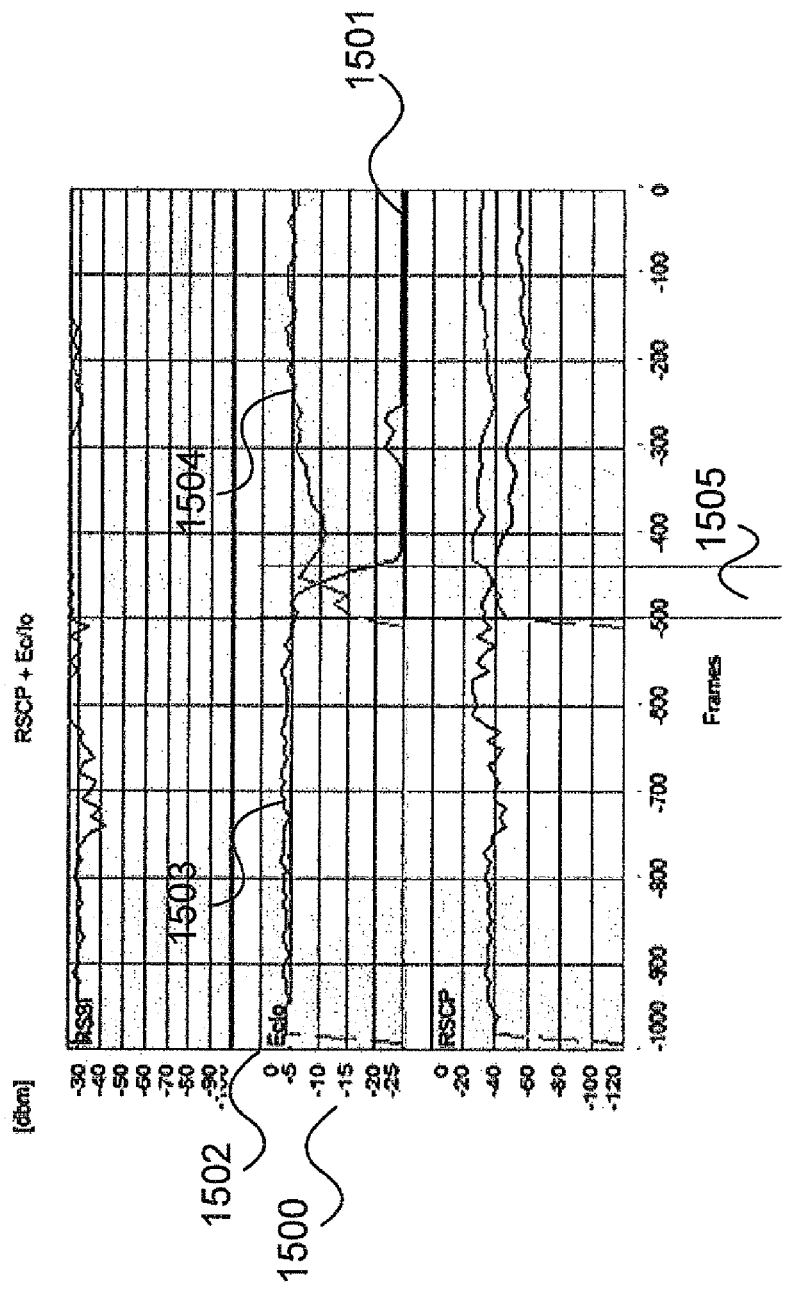
FIG. 15 shows a diagram of the quality of reception.

FIG. 15 shows a diagram of the quality of reception 1500.

Analogously to FIG. 5, the time increases from the left to the right along a time axis 1501 (x axis) in the diagram of the quality of reception 1500, the time being specified in units of frames, 100 frames corresponding to one second and the time zero being represented fully on the right. The quality of reception increases from bottom to top along a reception quality axis 1502 (y axis). In this case, the quality of reception is specified as a ratio of the energy of the received pilot signal to the received total energy (Ec/Io) in dBm.

A first graph 1503 shows the quality of reception of a first radio cell and a second graph 1504 shows the quality of reception of a second radio cell. The first radio cell and the second radio cell correspond, for example, to the first mobile radio cell 201 and to the second mobile radio cell 202 which are operated by the base station 200 shown in FIG. 2.

In a time domain 1505, the quality of reception of the first mobile radio cell drops and the quality of reception of the second mobile radio cell increases so that, for example, the quality of reception of the second mobile radio cell is too low for performing a handover procedure at the beginning of the time domain 1505 (e.g. the second mobile radio cell cannot yet be detected by the mobile radio terminal) and at the end of the time domain 1505 the quality of reception of the first mobile radio cell is too low for performing a handover procedure. In the example shown, the time domain 1505 only includes 60 frames, that is to say 600 ms. This corresponds, for example, to the scenario that a mobile radio communication device is moving at 120 km/h past the base station which operates the first mobile radio cell and the second mobile radio cell. Since a handover procedure, for example, typically requires 750 ms, the time domain 1505 is too short and a handover procedure cannot be performed and a connection breakdown can be the consequence.

According to one embodiment, the coverage area of one of the two mobile radio cells is extended into the other mobile radio cell, for example by approx. 50 m so that at the assumed speed of 120 km/h (=33 m/s), a typical motorway or highway speed, the time domain 1505 is extended by 1.5 s since an extension by 10 m produces an extension of the time domain by 300 ms.

Assuming that the handover procedure, from the beginning of the detection of the second mobile radio cell by the communication terminal to the reception of the handover command or the updating of the active set of the communication terminal, requires about 750 ms, the extension of the coverage area of one of the two mobile radio cells along the direction of movement of the communication terminal is sufficient.

It can thus be achieved that the quality of reception of the mobile radio cell left by the communication terminal is still good enough for receiving the handover command or, respectively, the updating of the active set of the communication terminal. As explained above, this is achieved by the fact that the first mobile radio cell which is left can be received for a longer time and thus the handover command or the updating of the active set can be received for a longer time or that the second mobile radio cell into which the communication terminal is moving can be detected earlier.

Although the invention has been shown and described mainly with reference to certain embodiments, those who are familiar with the field of technology should understand that numerous changes with respect to design and details can be carried out therein without deviating from the essence and field of the invention as defined by the claims following. The field of the invention is therefore determined by the attached claims and it is intended that all changes falling under the sense of the words or the range of equivalence of the claims are comprised.

What is claimed is:

1. A communication arrangement, comprising:
    a first antenna mounted on a mast to transmit signals into the coverage area of the first antenna;
    a second antenna mounted on said mast to transmit signals into the coverage area of the second antenna, wherein the coverage areas of the first and the second antennas overlap, creating an overlap area; and
    a signal radiating device to control the first antenna to radiate downlink signals for reception by a mobile communication device, into said overlap area of the first antenna and the second antenna;
    wherein the signal radiating device is further configured to control the first antenna to produce the downlink signals, in such a manner so as to extend an area in which both a signal strength of the downlink signals by the first antenna for reception by the mobile communication device and a signal strength of downlink signals by the second antenna for reception by the mobile communication device are sufficient to complete a handover of the mobile communication device from the first antenna to the second antenna.

2. The communication arrangement according to claim 1, further comprising:
    one or several base stations, the first antenna and the second antenna being antennas of the one or several base stations.

3. The communication arrangement according to claim 1, the signal radiating device being mounted on the mast.

4. The communication arrangement according to claim 1, wherein the signal radiating device is an active transmitting device.

5. The communication arrangement according to claim 4, further comprising:
    a signal generating device which supplies the same signals to the antenna and to the signal radiating device for sending out by means of the antenna and for sending out by means of the signal radiating device.

6. The communication arrangement according to claim 4, wherein the signal radiating device has a third antenna.

7. The communication arrangement according to claim 1, wherein the signal radiating device is passive.

8. The communication arrangement according to claim 7, wherein the signal radiating device is a reflector.

9. The communication arrangement according to claim 8, wherein the reflector is arranged remote from the mast.

10. The communication arrangement according to claim 8, wherein the reflector is arranged in the coverage area of the antenna.

11. The communication arrangement according to claim 8, wherein the reflector is arranged on the mast.

12. The communication arrangement according to claim 8, wherein the reflector is arranged in the main direction of radiation of the first antenna.

13. The communication arrangement according to claim 1, wherein the signal radiating device is arranged for radiating the signals in such a manner that the area is an area which does not exceed a predetermined maximum extent.

14. The communication arrangement according to claim 1, wherein the signal radiating device is arranged for radiating the signals in such a manner that the area is an area which is not less than a predetermined minimum extent.

15. The communication arrangement according to claim 1, wherein the signals sent out by the first antenna are spread by means of a first scrambling code and the signals sent out by the second antenna are spread by means of a second scrambling code, the first scrambling code and the second scrambling code being different.

16. The communication arrangement according to claim 1, wherein the signals sent out by the first antenna are spread by means of a first scrambling code and the signals radiated by the signal radiating device are spread by means of the first scrambling code.

17. The communication arrangement according to claim 1, wherein the signals are control signals.

18. The communication arrangement according to claim 17, wherein the signals are mobile radio network control signals.

* * * * *